US007772801B2

(12) United States Patent
Dowdy et al.

(10) Patent No.: US 7,772,801 B2
(45) **Date of Patent: *Aug. 10, 2010**

(54) VERSATILE LIGHTING DEVICE

(75) Inventors: Randal A. Dowdy, Drake, CO (US); Jeffrey A. Guyer, Dallas, TX (US); Justin D. Pendleton, Carrollton, TX (US); Brian L. Roderman, Plano, TX (US); Eric A. Tanner, Austin, TX (US)

(73) Assignee: Versalite Associates, Bedford, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/567,468

(22) Filed: Sep. 25, 2009

(65) Prior Publication Data

US 2010/0039063 A1 Feb. 18, 2010

Related U.S. Application Data

(63) Continuation of application No. 11/345,817, filed on Feb. 2, 2006, now Pat. No. 7,604,370.

(60) Provisional application No. 60/650,536, filed on Feb. 8, 2005.

(51) Int. Cl.
*H02J 7/00* (2006.01)

(52) U.S. Cl. ....................................... 320/107; 320/115

(58) Field of Classification Search ................. 320/107, 320/113, 115; 362/9, 194, 195
See application file for complete search history.

(56) References Cited

U.S. PATENT DOCUMENTS 3,786,575 A 1/1974 Riblett
4,001,571 A 1/1977 Martin
4,682,078 A 7/1987 Pascalide
4,712,167 A 12/1987 Gordin
4,841,278 A 6/1989 Tezuka
5,003,432 A 3/1991 Mandy (Continued)

FOREIGN PATENT DOCUMENTS

JP 405190007 A 7/1993

(Continued)

OTHER PUBLICATIONS

Fraen Srl FT3 Lens Series Brochures, Fraen Corporation, Reading, MA, Nov. 30, 2003, 6pp.

(Continued)

*Primary Examiner*—Edward Tso
*Assistant Examiner*—Richard V Muralidar
(74) *Attorney, Agent, or Firm*—Workman Nydegger

(57) ABSTRACT

A wall or ceiling mountable lighting device comprises a self-contained single or multiple LED light source for emitting warm yellow-white light corresponding to halogen or incandescent light and a control circuit controlled by a remote control unit to energize and deenergize the light source and control light intensity. A rechargeable battery power source mounted on the lighting device is connectable to the apparatus for charging the battery without removing the battery from the device. The apparatus includes an elongated probe assembly releasably connectable to the lighting device to perform the recharging process. The lighting device is particularly adapted for ease of placement of a light source for decorative purposes and/or illuminating artifacts in locations which would require substantial structural modifications to install conventional lighting.

20 Claims, 10 Drawing Sheets

U.S. PATENT DOCUMENTS

| | | | | |
|---|---|---|---|---|
| 5,165,783 | A | 11/1992 | Barron, Sr. | |
| 5,526,245 | A | 6/1996 | Davis | |
| 5,617,079 | A | 4/1997 | Harrison | |
| 5,772,309 | A | 6/1998 | Groben | |
| 5,934,787 | A | 8/1999 | Sharma | |
| 5,946,637 | A * | 8/1999 | Umbach et al. | 455/573 |
| 6,140,934 | A | 10/2000 | Lam | |
| 6,364,510 | B1 | 4/2002 | Bernhart | |
| 6,479,965 | B2 * | 11/2002 | Barbeau et al. | 320/115 |
| 6,604,842 | B2 | 8/2003 | Griffiths | |
| 6,652,115 | B2 | 11/2003 | Sharrah | |
| 6,744,223 | B2 | 6/2004 | Laflamme | |
| 6,798,167 | B1 | 9/2004 | Canino | |
| 6,953,260 | B1 | 10/2005 | Allen | |
| 7,011,435 | B1 | 3/2006 | Blaymore | |
| 7,027,736 | B1 | 4/2006 | Mier-Langner | |
| 2005/0243549 | A1 | 11/2005 | Ruston | |
| 2006/0176689 | A1 | 8/2006 | Dowdy | |

FOREIGN PATENT DOCUMENTS

| | | |
|---|---|---|
| WO | 2006086308 | 8/2006 |

OTHER PUBLICATIONS

Market Analysis Report, LJM Associates, Manhattan Beach, CA, May 5, 2005, pp. 5-8.

Luxeon Technical Data Sheet DS47, Lumileds Lighting, US, LLC, San Jose, CA, 12p., Sep. 19, 2004.

International Search Report, PCT/US06/04110, dated Jan. 28, 2008.

Office Action mailed Jul. 26, 2007 cited in U.S. Appl. No. 11/345,817.

Office Action mailed Jan. 30, 2008 cited in U.S. Appl. No. 11/345,817.

Office Action mailed Sep. 8, 2008 cited in U.S. Appl. No. 11/345,817.

Notice of Allowance mailed Jun. 19, 2009 cited in U.S. Appl. No. 11/345,817.

* cited by examiner

| Battery Life (Hours) | | | |
|---|---|---|---|
| | 20%<br>1 Click | 50%<br>2 Clicks | 80%<br>3 Clicks |
| Low Capacity<br>3 Cell 2400mAH | 21.82 | 13.48 | 9.06 |
| High Capacity<br>6 Cell 4800mAH | 43.64 | 26.97 | 18.11 |
FIG. 5
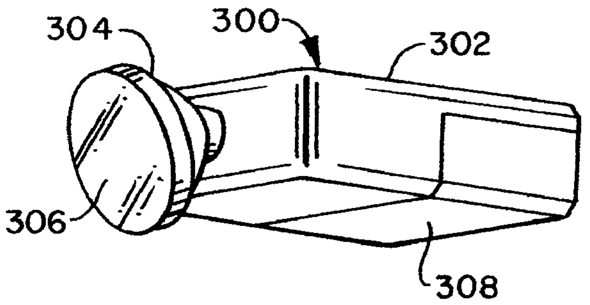
FIG. 6
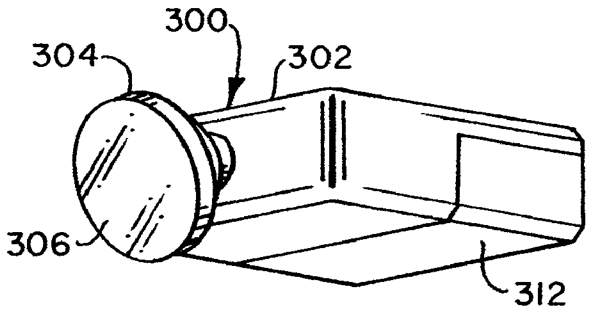
FIG. 7
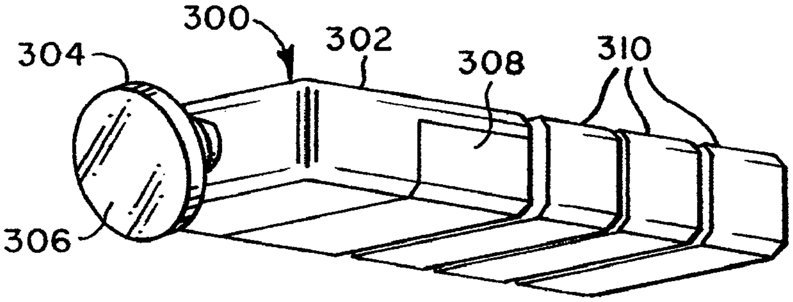
FIG. 8

VERSATILE LIGHTING DEVICE

CROSS-REFERENCE TO RELATED APPLICATIONS

This application is a continuation of U.S. patent application Ser. No. 11/345,813, entitled "Versatile Lighting Device", filed Feb. 2, 2006, which claims the benefit of prior provisional application Ser. No. 60/650,536, entitled "Versatile Lighting Device", filed Feb. 8, 2005, which are both incorporated herein by reference in their entireties.

BACKGROUND

The present invention relates to lighting devices, particularly to a versatile lighting device, and more particularly to a versatile lighting device for art gallery, display and decorative lighting applications.

Picture lights and display lights have been widely used in public establishments (e.g., galleries and museums) to illuminate paintings, artifacts and architectural details for enhanced visual effects. Recently, these lighting devices are slowly making their way into private homes. Many people attempt to make their homes appear warmer and more attractive by installing what used to be considered professional lighting fixtures. Private individuals may also have the need to showcase a wide range of possessions, such as paintings, prints, photographs, awards, artifacts, plants, flowers, and aquariums. A variety of decorative lighting devices have been designed and marketed for these purposes. The known types of decorative lighting devices have at least the following drawbacks.

A major portion of known lighting devices are powered by so-called household or conventional electric grid power sources. They are either required to be hard-wired to household electric lines or include power cords to be plugged into electric sockets. It is usually costly or at least troublesome to route and conceal the unsightly electric wires or power cords. Although a few battery-powered lighting devices have been proposed, they have not been commercially successful due to poor light quality (often linked to power constraints), short battery life, and the inconvenience of battery replacement or recharge.

Existing decorative lighting devices typically tend to be obtrusive and lack flexibility or versatility. Once installed in a ceiling or on a wall, they cannot easily be moved to a different location without extensive reinstallation or rewiring. The light intensities are usually fixed or not easily adjustable. Typically, the light beams, with respect to focus and direction, can only be adjusted manually, which may be cumbersome and even unsafe, since many decorative lighting devices are installed in hard-to-reach places.

Still further, many decorative lighting devices are designed and/or installed in an obtrusive fashion. When a picture light or display light is implemented, it is desirable to draw attention to the painting or artifact that is on display, not the light source. Preferably, the light itself should be hidden or invisible, or at least unobtrusive and unnoticed. Currently, very few ceiling-mountable or wall-mountable decorative lights meet this requirement. Recessed lighting may partially solve this problem, but the installation involves creating openings in a wall or ceiling, which is not always feasible.

In view of the foregoing, it is desirable to provide a more efficient solution for decorative lighting.

BRIEF SUMMARY

The present invention provides a versatile lighting device that overcomes deficiencies of known lighting devices and systems.

According to one embodiment of the invention, a versatile lighting device is provided which is operable to produce appealing and pleasing illumination. The lighting device may not require any connection to an electric grid power source or outlet. One or more batteries that power the lighting device may be charged without removal from the installed lighting device. The batteries may have relatively long run-time and short charge time. Alternatively, the lighting device may be powered by a low-profile power unit which is wired to an AC power source. The lighting device may comprise a low-power consuming light source, such as one or more light emitting diodes (LEDs), to provide bright and warm illumination that is comparable to natural light. The lighting device may be provided in various configurations, including wall sconces, picture lights and various forms of decorative lighting, and may be remotely controlled to achieve desired lighting effects, including position, intensity and focus.

The present invention still further provides a versatile lighting device which may be mounted in a wide variety of locations, and powered by an onboard battery power source. The battery source may be conveniently recharged without removal from the lighting device by a charging apparatus which includes an elongated wand, rod or pole for connecting a source of recharging power to the battery. The battery charging apparatus may be easily connected to the lighting device and easily removed therefrom. The charging apparatus may be stored in a closet or other storage space when not needed and may include a telescoping type rod or pole to facilitate access between a source of charging power and the lighting device itself.

The present invention will now be described in more detail with reference to embodiments thereof as shown in the accompanying drawings. While the present invention is described with reference to preferred embodiments, it should be understood that the invention is not limited thereto. Those of ordinarily skill in the art having access to the teachings herein will recognize additional implementations, modifications, and embodiments, which are within the scope of the present invention, and with respect to which the present invention may be of significant utility.

BRIEF DESCRIPTION OF THE DRAWINGS

FIG. 5 is a table showing certain performance parameters of a selected type of battery which may be suitable for use with the lighting device of the invention;

FIG. 6 is a perspective view of another preferred embodiment of a lighting device in accordance with the invention;

FIG. 7 is a perspective view of still another preferred embodiment of a lighting device of the invention;

FIG. 8 is a perspective view of yet another preferred embodiment of a lighting device in accordance with the invention;

DETAILED DESCRIPTION

Reference will now be made in detail to the embodiments of the invention which are illustrated in the accompanying drawings. The drawings are not necessarily to scale and certain components may be shown in schematic form in the interest of clarity and conciseness.

Figure 1:
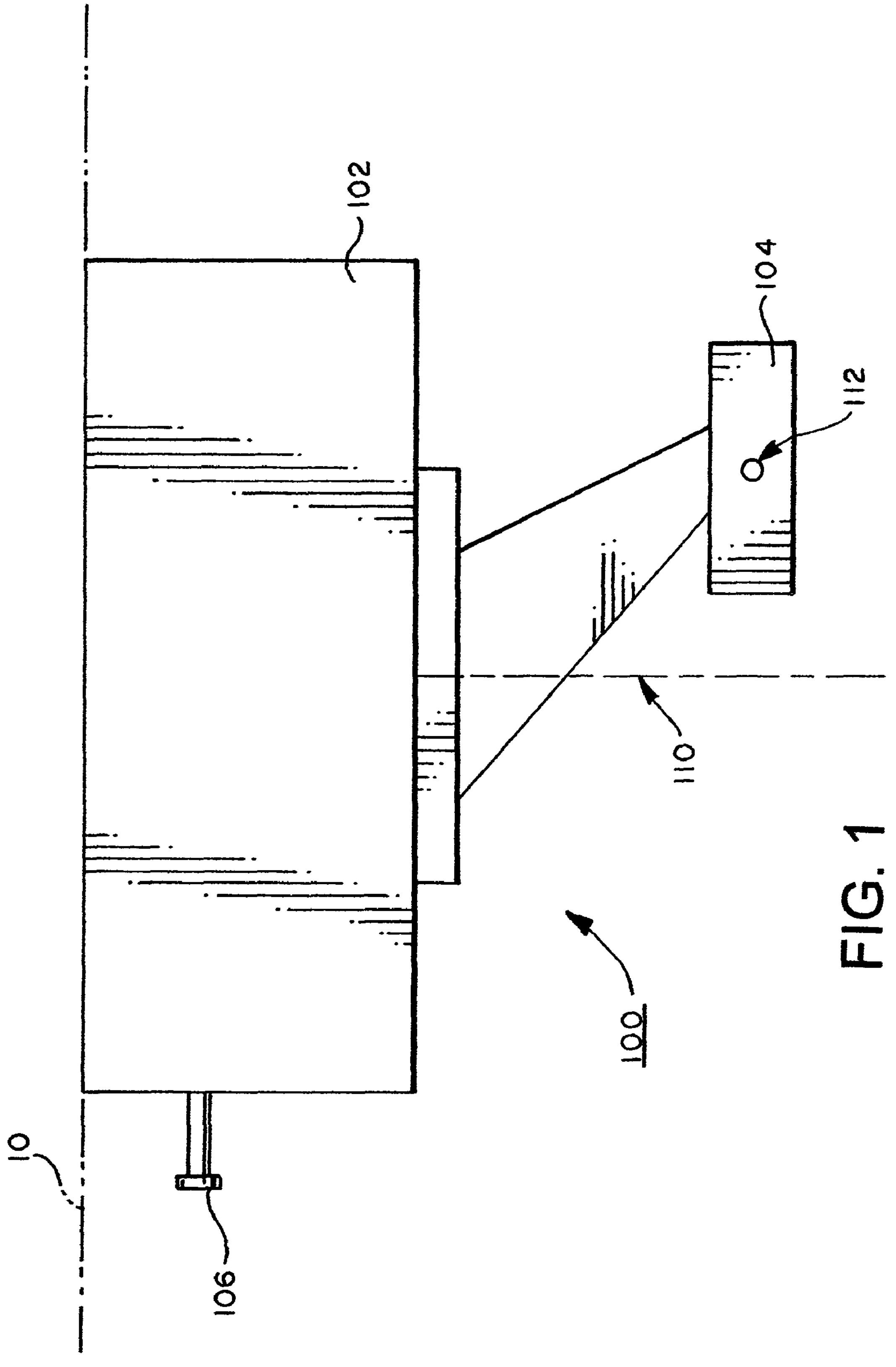
FIG. 1 is a simplified side elevation view in somewhat schematic form of a lighting device according to one preferred embodiment of the invention.

Referring to FIG. 1, there is shown an exemplary lighting device 100 according to one embodiment of the invention. The lighting device 100 may comprise two main components: a base 102 and a pan-tilt assembly 104. The base 102 may house electronics and one or more batteries. The pan-tilt assembly 104 may house a lens, one or more LEDs, and a heat sink.

The base 102 may be mounted to a surface 10 or a recess opening therein. The base 102 may be mounted via a number of mechanisms. For example, the base 102 may be screw-mounted via a ceiling mount or a wall mount, or the base 102 may include a hook and loop patch-type fastening means, an adhesive pad or other detachable mounting devices. Since the lighting device 100 is battery-powered, it may be installed in various rooms and in various configurations based on specific decorative needs. For example, the lighting device 100 may be mounted on a wall above a painting, poster or mirror. The lighting device 100 may be attached to a ceiling with its light beam directed to and/or focused on a painting on a nearby wall. Alternatively, the lighting device 100 may be positioned above a shelf to highlight artifacts displayed thereon. The lighting device 100 may be hidden under a mantle to illuminate fireplace displays, for example. According to other embodiments of the invention, the base 102 or the entire lighting device 100 may be recessed in a wall or ceiling opening, for example, to make the fixture appear even less intrusive.

Referring further to FIG. 1, the base 102 may comprise battery charge pins or contact elements 106, one shown, to which a charging apparatus (not shown in FIG. 1) may be temporarily coupled to charge the batteries. Though the charge pins 106 are shown as protruding out of the base 102, they are preferably recessed (e.g., in a socket). One or more batteries, preferably rechargeable, may be provided in a modular battery pack so that the batteries may be easily replaced at the end of their lives. The batteries may occupy the greatest amount of space and contribute the most to the overall weight of the lighting device 100. In one embodiment, a battery component may measure no more than 2.5 inches by 2.3 inches by 1.50 inches and weigh as little as 0.5 lbs. Electronic control circuitry may occupy a 2.25 inch by 4.0 inch printed circuit board (PCB) in the same package as the battery. In another embodiment, the battery component may be optionally replaced with a transformer in the same modular enclosure, which transformer may be connected to an AC grid electric line or plugged into a suitable outlet.

The pan-tilt assembly 104 may rotate around a pan axis 110 and/or tilt a light beam to a desired angle around a tilt axis 112. Tilting and panning adjustments of the pan-tilt assembly 104 may be remotely controlled. Although conceptually illustrated in FIG. 1 as a separate component, the pan-tilt assembly 104 may be housed in substantially the same enclosure as the base 102. The overall enclosure may present an aesthetic yet functional appearance. In order for the lighting device 100 to be unobtrusive, its enclosure may, preferably, have the same color as the surface 10 and/or the surrounding environment. Therefore, enclosures with a wide range of colors may be provided. Alternatively, the enclosure may be made of a paintable material, such as a white plastic with a paintable surface, so that the lighting device 100 may be easily adapted to a desired color.

Figure 2:
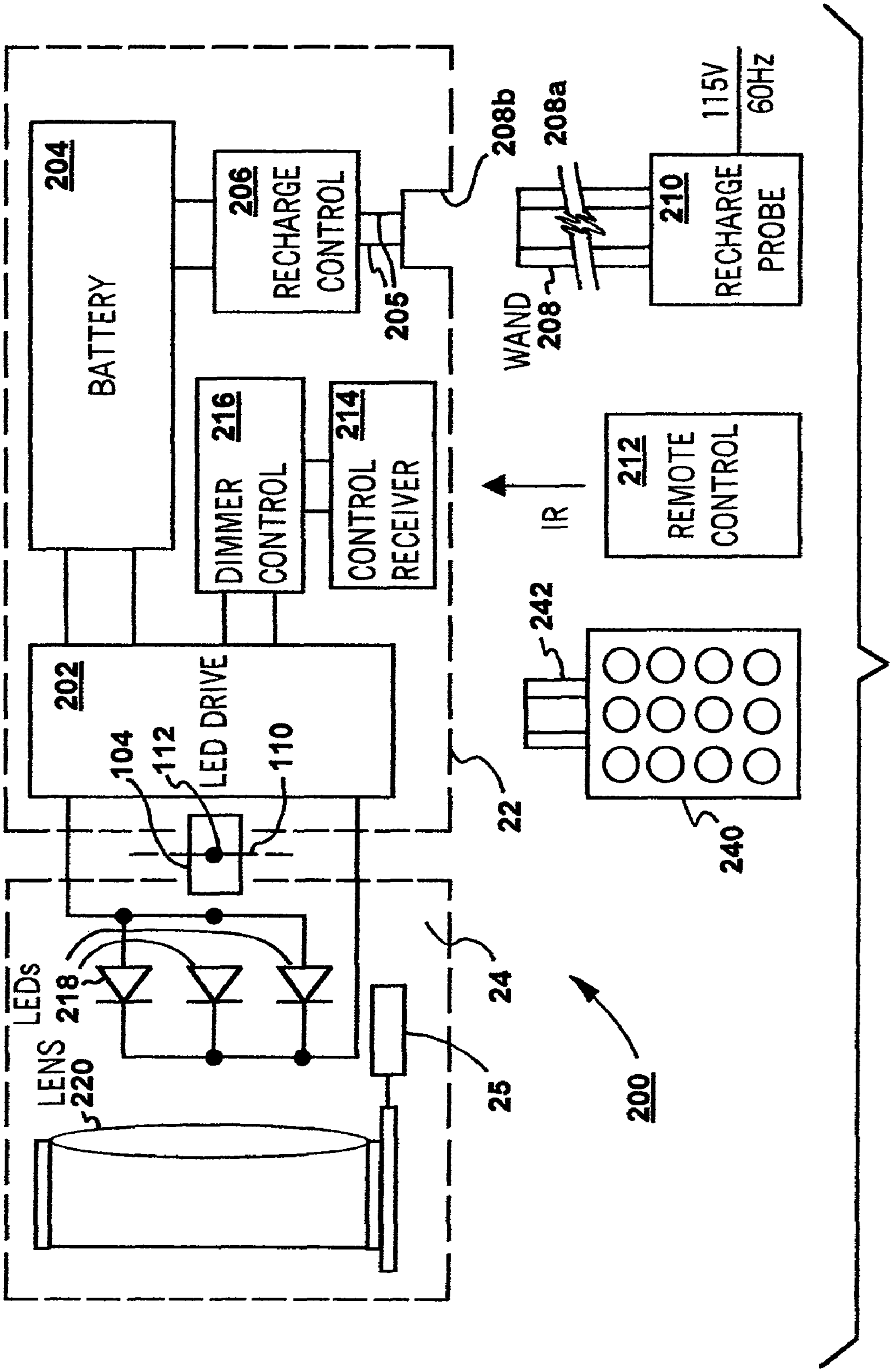
FIG. 2 is a diagram illustrating components of a lighting device according to the invention.

FIG. 2 comprises a block diagram illustrating functional components of an exemplary lighting device 200 according to another preferred embodiment of the invention. The lighting device 200 may comprise a base 22, a light emitter and lens support assembly 24 and a suitable beam focus adjusting mechanism 25. A pan-tilt mechanism 104 interconnects assembly 24 with base 22. The assembly 24 may comprise a set of LEDs 218 and a lens 220. Developments in LED technology have enabled the creation of a warm spot light with minimal power consumption so that the lighting device 200 can be battery powered. According to one embodiment, the LEDs 218 may include Luxeon™ brand Warm White Emitters from Lumileds Lighting, U.S., LLC of San Jose, Calif. The Luxeon™ brand Warm White LEDs provide a light that closely resembles that emitted by the desired warm yellow-white halogen/incandescent light. The Luxeon™ brand Warm White LEDs have a nominal correlated color temperature (CCT) of 3200K, describing the warmth or coolness appearance of a light, and a typical color rendering index (CRI) of 90, describing the effectiveness of a light source on color appearance (CRI of 100 represents the maximum most "natural" looking reference condition). Compared with incandescent bulbs, which generally have a low CCT around 2700-3000K and a high CRI, the Luxeon™ brand Warm White LED is a good low-power alternative. Other colors may be provided using paintable LEDs and/or lenses.

The LEDs 218 may be connected either in series or in parallel. The number of LEDs 218 may be determined based on a total required number of lumens desired. Depending on the desired light intensity, the LEDs 218 may be customized together with the associated electronics and battery component. The LED light emitting intensity may also be controlled to conserve battery power.

The lens 220 may be an FT3 Tri Lens Module from Fraen Corporation of Reading, Mass. The FT3 Tri Lens Module, is an off-the-shelf product specially designed for the Luxeon™ brand LEDs. The high collection efficiency reaches 85% of the total flux and provides a clear, focused beam with minimal hotspots. This means that the lens preserves 85% of the light quality characteristics after filtering the light beam. Though this is a tri-lens module, it functions very well when using only one or two LEDs. The lens focuses all LED configurations similarly without creating hotspots. According to preferred embodiments of the invention, it may be beneficial to attach one or more color filters to the lens 220 in order to obtain a desired color of illumination that is different from the original color of the LEDs 218. Other filters, such as ultraviolet (UV) filters and dispersion filters, may also be attached to the lens 220. As mentioned above, the LEDs may be modified to provide different color light.

The LEDs 218 may be powered by a LED drive circuit 202 suitably disposed on the base 22. The Luxeon™ brand LEDs are characterized at 350 mA. The cut-in voltage required to run each LED is approximately 3.6 volts. If three LEDs are placed in series, the LED drive circuit 202 must supply 10.8 volts. Given this voltage, the power dissipation is expected to be approximately 3.78 watts for the LEDs 218. The LED drive circuit 202 may employ a DC to DC voltage converter to boost the voltage output of a battery 204. For example, a six-volt output from a battery may be boosted to twelve volts in order to run the three LEDs 218 in series. This DC to DC voltage converter may allow the use of a smaller battery to produce the same voltage as a larger battery. The LED drive circuit 202 may also be compatible with one or more LEDs in series. The more LEDs, the shorter time they may be run on a single charge of the battery 204.

Referring briefly to FIG. 5, there is shown a table of battery life for certain battery capacity and operating conditions of a versatile lighting device in accordance with the invention. The data for FIG. 5 is determined using a preferred embodiment of a battery which is a lithium ion type battery which is of a type that is lightweight and offers a particularly long runtime or life. Still further, by dimming the output light emitted by a lighting device using batteries of the type mentioned, battery life may be extended substantially, as indicated. For example, using pulse width modulation (PWM) where in the LEDs of the lighting device are energized twenty percent of the time, a high capacity six cell battery package might provide as many as forty-three hours of operation while a three cell battery operating on a duty cycle of eighty percent illumination by pulse width modulation (PWM) the runtime for the lighting device may be as low as about nine hours. It should be noted that other chargeable and rechargeable batteries may also be implemented with varying costs and recharging times including, but not limited to, lead-acid, nickel hydride and nickel cadmium batteries, for example.

In accordance with an important aspect of the invention, the battery 204 may be charged without being removed from the base 22. A charge apparatus or so-called probe 210, including an elongated rod or wand 208, may charge the battery 204 through a charge control module 206. The wand 208 may be either foldable or telescopic with an adjustable length to accommodate different ceiling heights or other difficult to access locations of the device 200. The wand 208 include a coaxial pin type connector 208*a* which may be inserted in a cooperating socket 208*b* and partially secured to a pair of recessed conductor pins 205 in the base 22. As a result, the wand 208 is prevented from disconnecting during a battery charging operation. However, a quick release mechanism or breakaway connection may be implemented in case the wand 208 is accidentally pulled, so that the lighting device 200 will not be unintentionally damaged or detached from its mounted position. The distal end of the wand 208 may also include two metal hooks, not shown, to provide a mate to recessed charge connector pins on the battery pack, not shown. A nonconductive cap, not shown, may be used to prevent the circuit from being shorted if the wand 208 is misplaced or inadvertently touched.

According to one embodiment, charging a three cell lithium ion battery from a discharged state may require 1.20 amps DC current for approximately two hours. At floor level, a transformer in the charge apparatus or probe 210 may convert 115 volts AC power from a wall outlet to a suitable battery charging voltage which goes through the wand 208. The wand 208 may have a receptacle to accept a plug from the transformer. The charge control module 206 may automatically shut off when the battery 204 is fully charged.

Referring further to FIG. 2, power for charging the battery 204 for the lighting device 200 may also be obtained from a photovoltaic power source, such as that indicated by numeral 240 in FIG. 2. The photovoltaic power source 240 includes a suitable adapter 242 to be connected to the charge control circuit 206 in place of the wand 208. Accordingly, electromagnetic radiation may be focused on or applied to the power source 240 which may then transfer the power to the battery 204 by way of the charging control circuit 206. Such an arrangement would be particularly useful for applications of the lighting device 200 which are substantially inaccessible by electrical wiring or by other means of connecting the charging control circuit to a power source, such as the wand 208 and the charge probe circuit 210. Yet further methods for charging the battery 204 can include removing the battery and/or battery unit from the lighting device and using the charging methods described herein or by providing the battery unit with its own adapter for charging by placement in communication with the electric grid at a convenient interior wall outlet, for example. The battery unit or the entire lighting device might be adapted for connection to the electric grid through a wall outlet or into a recharging base, depending on the economics of providing this additional structure and the convenience of using it or not.

Figure 3:
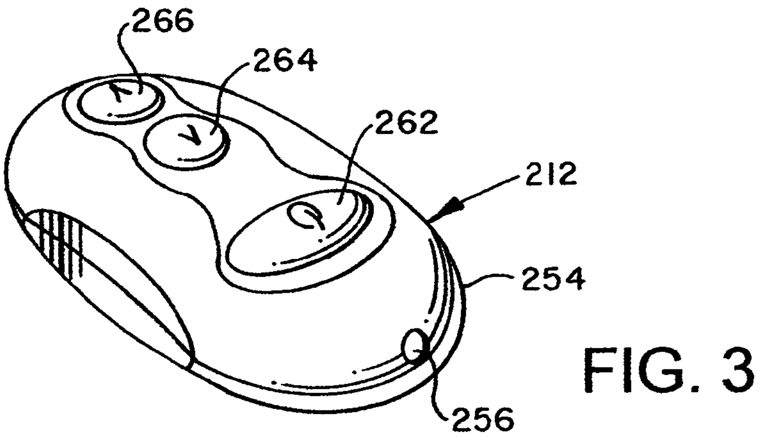
FIG. 3 is a perspective view of a remote control unit for a lighting device according to the invention.
Figure 4:
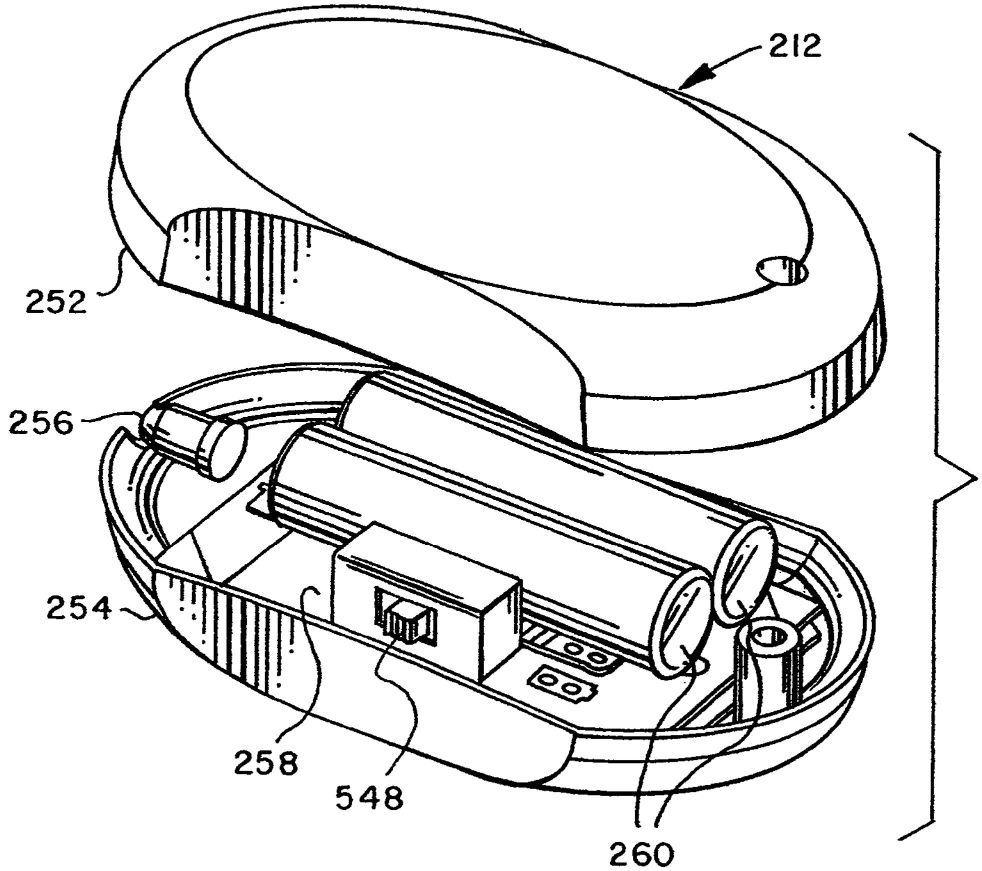
FIG. 4 is an exploded perspective view of the remote control unit shown in FIG. 3.

The lighting device 200 may be remotely controlled via remote control unit 212, FIGS. 3 and 4 also. A control receiver 214, FIG. 2, in the base 22 may receive and decode infrared (IR) signals transmitted from the remote control unit 212. A dimmer control module 216 may cause the illumination intensity of the LEDs 218 to be incrementally or continuously adjusted. A pulse width modulation (PWM) circuit may be used to dim the LEDs 218. This circuit may modulate a DC signal to create a flickering power source that provides power to the LEDs 218. The flicker may be undetectable to the human eye. The ratio of time the light is turned on versus turned off per cycle, or so-called duty factor, of 60% means the LEDs 218 will illuminate for 60% of the time in each cycle. Manipulating the duty factor controls the light intensity and can cause the light to be dim or bright. This circuitry may also provide a simple and inexpensive way to increase the battery life because the LEDs 218 are flickering instead of constantly draining the battery 204. For example, a lighting device according to the invention would be operable for a longer period of time using the same battery if the PWM was set to 85% duty factor instead of 100%.

Although only the dimmer control module 216 is shown coupling the control receiver 214 and the LED drive circuit

202, a number of functions associated with the lighting device 200 may be controlled in a similar manner. For example, the beam focus may also be remotely controlled by way of suitable control circuitry connected to the mechanism or apparatus 25. In addition, the panning and tilting movements of the pan-tilt assembly 104 may be remotely controlled so that the light beam may be positioned as desired. If a timer is, implemented for the lighting device 200, the timer may also be remotely set or adjusted.

According to other embodiments of the present invention, it may sometimes be desirable to power the lighting device through an AC grid. In this case, a low-profile AC power unit may be wired to the AC grid and convert a standard AC supply voltage (e.g., 120V or 220V) to a desired DC voltage (e.g., 10V or 12V). According to one particular embodiment, a Model PSA-15LN power supply unit manufactured by Phihong USA, Inc. of Fremont, Calif. may be a suitable choice. The PSA-15LN power supply unit is a compact AC-to-DC converter that can take a 3-wire or 2-wire 90-264VAC input and generate a DC output which can be a preset value between 3.3V and 24V. Further, the lighting device of the invention may be designed to operate on battery only, on AC power only, or interchangeably on either battery or AC power. In a lighting device with interchangeable power supply capability, the AC power unit may have physical dimensions substantially similar to those of the battery component so that either power supply may fit into the same lighting device.

Referring further to FIGS. 3 and 4, the remote control unit 212 includes a two-part housing comprising opposed shell-like housing members 252 and 254 which are suitably secured together in a conventional manner. The remote control unit 212 includes a radiation beam emitter, preferably emitting infrared radiation, and designated by numeral 256. Emitter 256 is suitably connected to a control circuit 258 including a three position slide switch 548 the purpose of which will be described later herein. Control circuit 258 is supplied with power by suitable batteries 260 disposed within the housing 252, 254, FIG. 4. The control circuit 258 will be explained in further detail herein. As shown in FIG. 3, the control unit 212 includes a pushbutton momentary type switch including a switch actuator 262 for controlling the energization of the lighting device 200. Still further, the control unit 212 includes suitable pushbutton type switch actuators 264 and 266 for controlling the intensity of the light emitted by the device 200. Thus, remote control of a lighting device in accordance with the invention may be easily carried out by the use of an aesthetically pleasing hand-held remote control unit which includes its own source of electric power and which may be used to control energization of the lighting device 200, as well as other embodiments of the lighting device described herein. An additional control switch, not shown, may be included in the remote control unit 212 for controlling a panning and tilting drive mechanism and a focusing mechanism, such as previously described.

Referring now to FIGS. 6, 7 and 8, for example, there is illustrated a versatile lighting device generally designated by the numeral 300 including a housing 302 for supporting a movable head or housing member 304 including a lens 306 and one or more LED light sources, not shown in detail in FIGS. 6, 7 and 8. Housing 302 is adapted to removably support a rechargeable battery unit 308 suitably connected to the housing 302 for removal therefrom or for connection to a charging apparatus of a type generally as described herein. As shown in FIG. 8, additional battery units 310 may be connected to the housing 302 or to the battery unit 308 to extend the life and, perhaps, the power output of the lighting device 300. Alternatively, as shown in FIG. 7, the battery unit 308 may be replaced by a self-contained AC power conversion unit 312 whereby the lighting device 300 may be "hard wired" to an AC power source and the power converter unit 312 is operable to convert the power required by the lighting device 300 to the appropriate, DC voltage desired.

The battery units 308 and 310 may, for example, be of modular construction and be adapted to receive shrink-wrapped packs of one or more individual battery "cells" which could be added to the units 308 and 310 to increase operating life of the lighting device 300 between battery charging operations. Alternatively, the battery units 308 and 310 could be of different capacities. One problem associated with multiple battery cells and one or more battery units is to properly charge and discharge the batteries. Providing contacts for connection of the battery units to a charging apparatus can be difficult to accomplish in a way which will provide the ability to connect all the batteries to the charging or discharging conductors in parallel. Moreover, if battery units or individual batteries of differing ages are used, charging without systemized control may not be proper. One solution to this problem would be to devise a raceway of pass-through conductor housings or casings enabling independent conductors to be connected to the lighting device control circuit and to a charging unit or apparatus. The pass-through arrangement could be controlled by DIP switches, to provide a modular unit so that any battery would be operable in any position. Such an arrangement would also be required for charging the battery units with a charging module located on a master circuit board. Such an arrangement might require extensive software written into a microprocessor controller for discharging one battery at a time and then charging the batteries, also one battery at a time.

Figure 9:
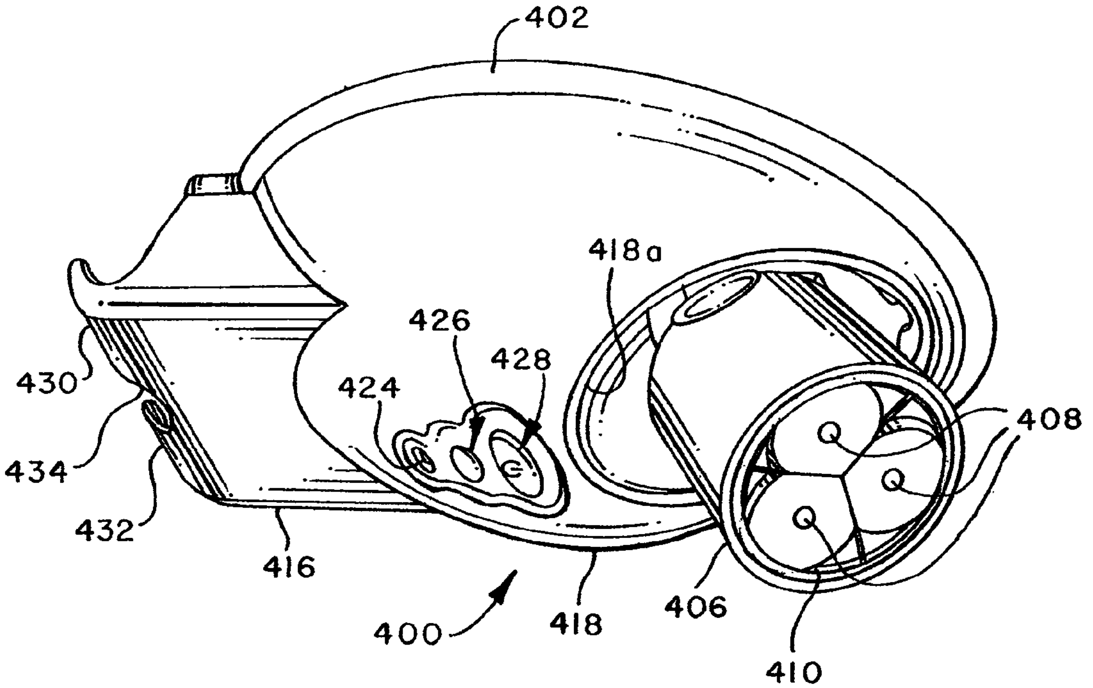
FIG. 9 is a perspective view of still another preferred embodiment of a lighting device in accordance with the invention.
Figure 10:
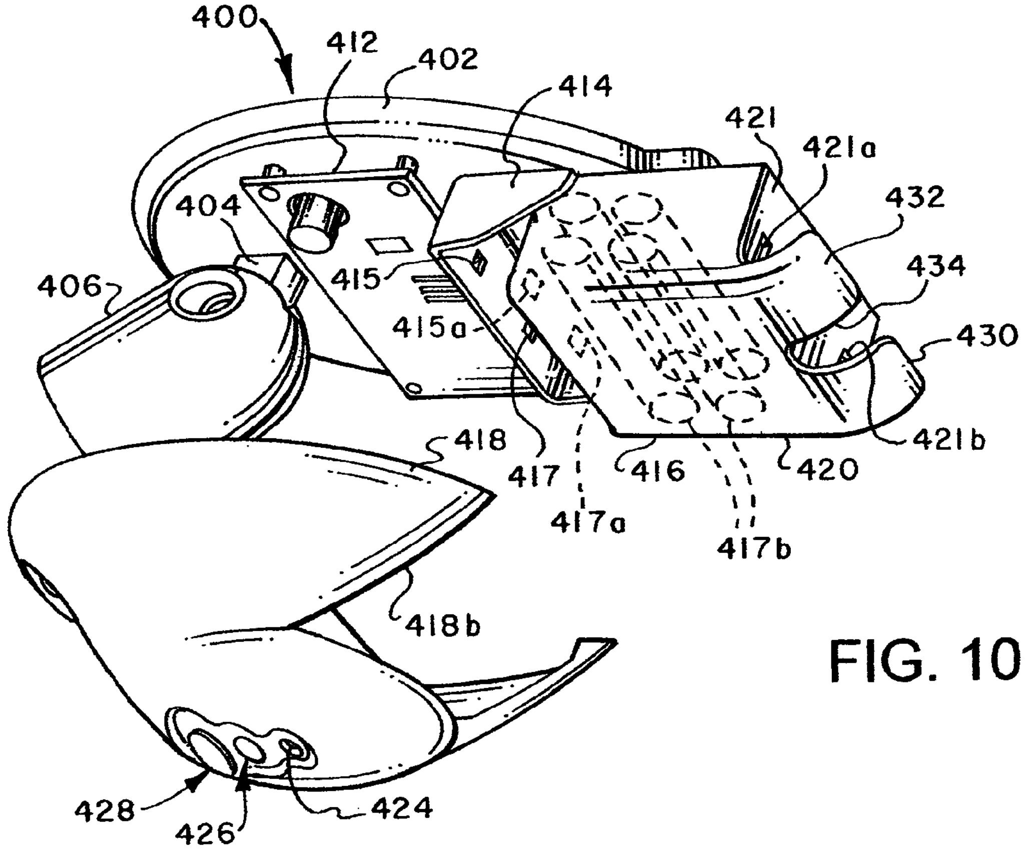
FIG. 10 is an exploded perspective view of the lighting device shown in FIG. 9 and taken from a different perspective.

Referring now to FIGS. 9 and 10, still another preferred embodiment of a versatile lighting device in accordance with the invention is illustrated and generally designated by the numeral 400. The lighting device 400 is characterized by a generally planar oval-shaped base 402 which may be adapted for mounting on a ceiling surface or any surface operable to accommodate the base. The base 402 is provided with a pedestal type support member 404 for supporting a light emitter and lens support housing 406 which is operable to support plural LED light emitters 408 and a suitable collimating lens 410, FIG. 9. Housing 406 is mounted on suitable trunnions connected to the pedestal 404 whereby the housing 406 and the light emitters may be positioned in a predetermined direction with respect to the base 402. Base 402 also supports a control circuit board 412, as shown in FIG. 10.

Referring further to FIGS. 9 and 10, the lighting device 400 further includes a support bracket 414, FIG. 10, for supporting a removable battery unit 416. A removable cover comprising a somewhat arcuate shell-like member 418 is adapted to be removably connected to the base 402. The base 402, housing 406, cover 418 and a housing 420 for the battery unit 416 may all be made of a suitable thermoplastic or polymer, such as ABS or a polycarbonate. Battery unit 416 may be suitably connected to control circuitry mounted on board 412 by way of suitable contacts 415 and 417 mounted on bracket 414, FIG. 10, and cooperating contacts 415*a* and 417*a* on battery unit 416. Battery unit 416 includes plural battery "cells" 417*b*, FIG. 10. As shown in FIGS. 9 and 10, the cover 418 is provided with suitable openings 418*a*, FIG. 9 and 418*b* to accommodate the movable housing 406, and the battery unit 416. Cover 418 also supports a radiation sensor 424, an LED indicator 426 and a pushbutton momentary type switch actuator 428 for energizing or extinguishing the LED light sources 408. Sensor 424 is operable to receive radiation signals from emitter 256 of the remote control unit 212 and indicator 426 is operable to indicate the charge status of the battery unit 416. Lighting device 400 may also be adapted to be a hanging or clip-on type device for illuminating works of art and the like.

One significant advantage of the lighting device 400, as well as the other lighting devices disclosed herein, is the provision of means on or associated with the battery unit 416 for supporting an apparatus for supplying battery charging power to the battery unit. Housing 420 includes spaced apart laterally and upwardly extending somewhat arcuate fingers 430 and 432, FIGS. 9 and 10, and defining a slot 434 therebetween. One wall 421 of housing 420, FIG. 10, supports spaced apart battery charging contacts 421*a* and 421*b*, which contacts face toward the fingers 432 and 430, respectively.

Figure 11:
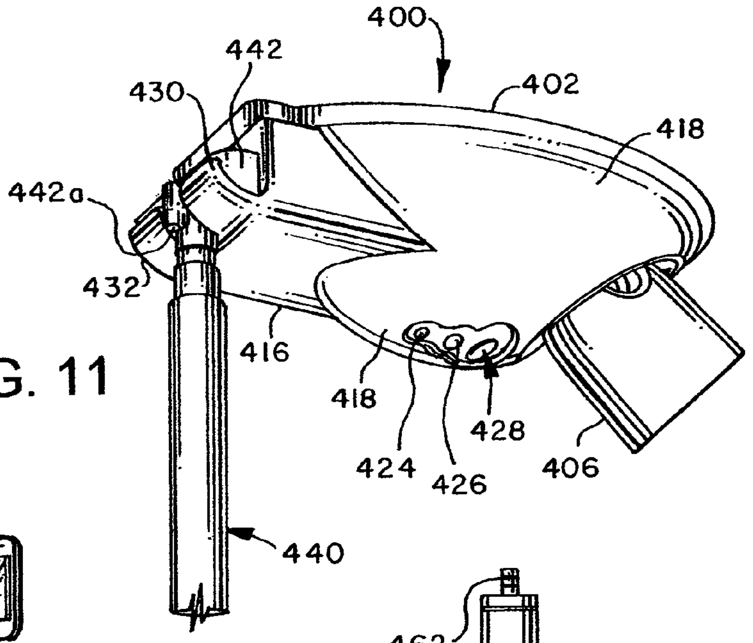
FIG. 11 is a perspective view of the embodiment of the lighting device shown in FIGS. 9 and 10 and illustrating the connection between a charging apparatus for charging the battery of the lighting device.
Figure 12:
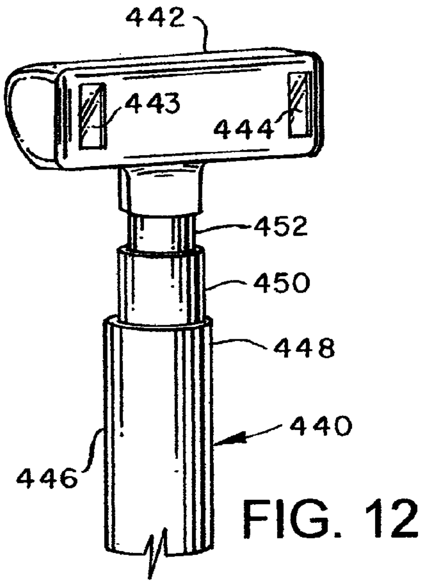
FIG. 12 is a detail perspective view of an embodiment of a battery charging apparatus.

Referring now to FIGS. 11 and 12, the lighting device 400 is particularly adapted for charging of the battery unit 416 utilizing a charging apparatus or so-called probe similar to the wand 208. The battery charging apparatus or probe shown in FIGS. 11 and 12 is generally designated by the numeral 440 and includes a transverse head part 442 having suitable electrical contact members 443 and 444 mounted thereon for engagement with the contact members 421*a* and 421*b*. The battery charging probe 440 is characterized by a suitable telescoping or detachable pole assembly 446 having telescoping pole sections 448, 450 and 452 with the latter pole member being directly connected to the head 442. Fewer or greater numbers of pole sections may be utilized in the apparatus or probe 440. Moreover, the pole sections may be releasably connected to each other to extend the working length of the probe 440 as compared with being a telescoping type probe assembly as shown in FIGS. 11 and 12.

Figure 14:
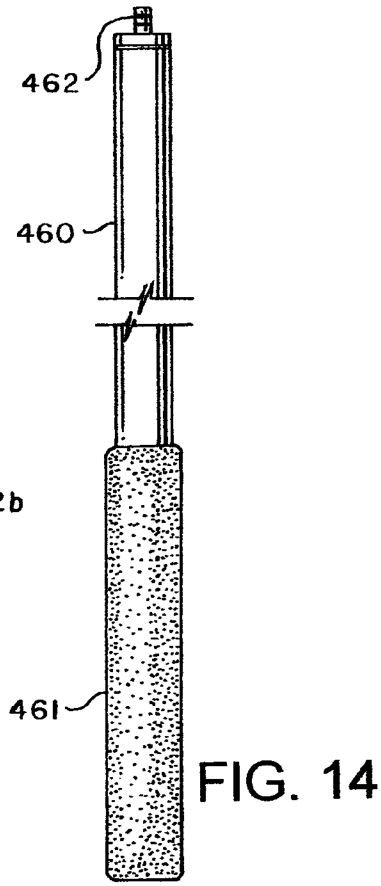
FIGS. 13 and 14 are detail side elevation views of parts of another embodiment of a charging apparatus.
Figure 15:
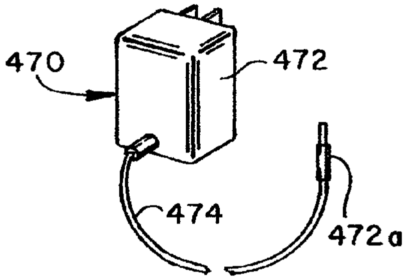
FIG. 15 is a perspective view of a power supply unit for supplying power to and through the charging apparatus for charging the battery or batteries of the lighting device of the invention.
Figure 13:
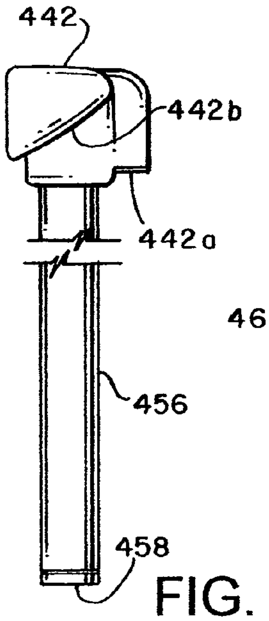

For example, viewing FIGS. 13 and 14, the head 442 is shown connected to a fixed length pole or tube 456 having a receptacle 458 at its lower end for connection to an extension pole member 460 having a grip 461 formed thereon, FIG. 14. A suitable breakaway coupling 462 is formed on the distal end of pole member 460 for engagement in the receptacle 458 for normally maintaining the pole sections 456 and 460 connected to each other, but allowing breakaway in the event that, while a charging operation is in process, a person inadvertently substantially deflects the pole assembly. In such an event, pole member 460 may detach from pole member 456. As shown in FIGS. 11 and 13, the head 442 is provided with a boss defining receptacle 442*a* for receiving a coaxial pin type electrical connector of a power source 470, see FIG. 15. Power source or power supply unit 470 is of a type which may be directly connected to an electrical grid and includes a transformer and rectifier unit 472 for reducing AC voltage to a suitable DC voltage for charging the batteries of battery unit 416. Power supply unit 470 includes elongated, flexible conductor means 474 connected to a coaxial pin-type connector 472*a* for connection to the head 442 via the receptacle 442*a* whereby the contacts 443 and 444 are then in electrically conductive communication with the power supply unit 470. Alternatively, suitable conductors, not shown, may be extended through the pole assembly of the apparatus 440 internally to eliminate the separate flexible conductor means 474 and the pin-type connector 472*a*.

Accordingly, when it is desired to charge the battery unit 416 of lighting device 400, such as would be indicated by the color of the visual indicator 426 turning from green to red, for example, the battery charging apparatus or probe assembly 440 would be connected to a source of power by way of the power supply unit 470 and placed in electrically conductive contact with the battery unit 416 by hanging the head 442 in the position shown in FIG. 11 in engagement with the fingers 430 and 432. Thanks to the sloping bottom wall 442*b*, FIG. 13, of the head 442 and the arcuate shape of the fingers 430 and 432, the head of the charging apparatus or probe assembly 440 is biased into engagement with the wall 421 of battery unit housing 420 and the electrical contacts on the head 442 and those supported on the wall 421, respectively, are forced into engagement. Once charging is completed, the probe assembly 440, including the modification illustrated in FIGS. 13 and 14, may be removed from the lighting device 400 until battery charging is again required.

Figure 19:
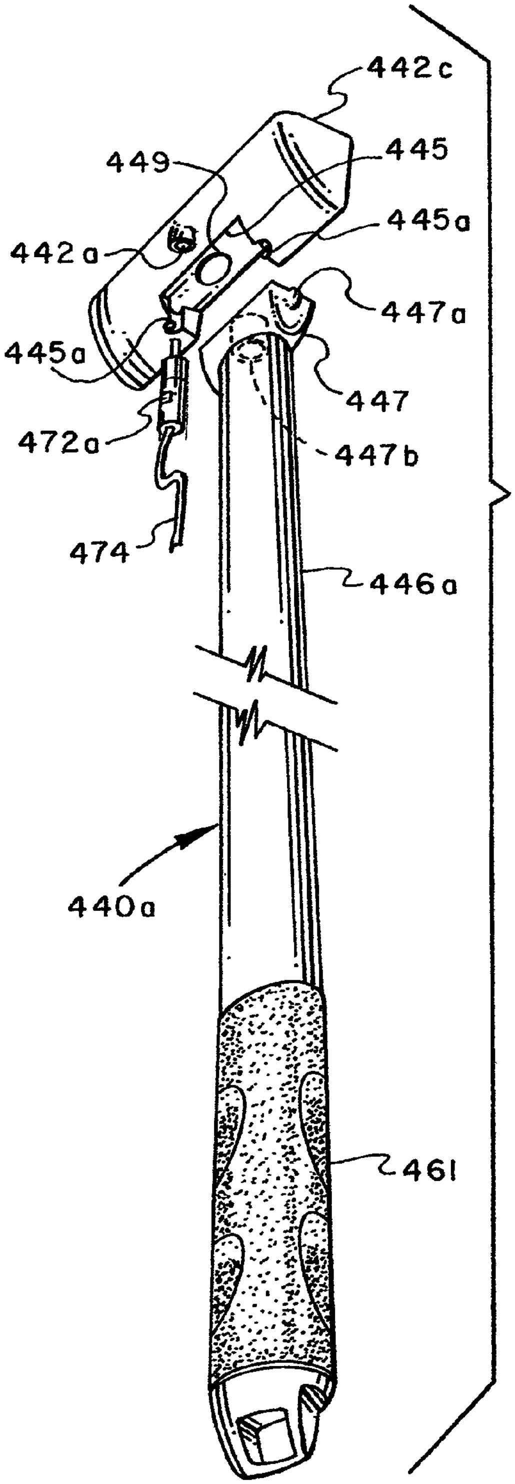
FIG. 19 is a perspective view of another embodiment of a charging apparatus for the lighting device of the invention.

Referring briefly to FIG. 19, another embodiment of a charging apparatus for the lighting device of the invention is illustrated and designated by the numeral 440*a*. The charging apparatus 440*a* includes an elongated pole or rod 446*a* which may be telescoping or made up of interconnected sections and includes a boss 447 formed on a distal end thereof, which boss may be provided with opposed hemispherical projections 447*a*, one shown, and a tubular or so-called barrel magnet 447*b* supported thereon. The pole 446*a* of the charging apparatus 440*a* is provided with a detachable head member 442*c* similar in some respects to the head member 442 but modified to be detachably connected to the pole 446*a*. Head member 442*c* includes a receptacle 442*a* for receiving the axial pin-type connector 472*a* and a recess 445 formed therein for receiving the boss 447 of the pole 446*a*. Opposed slots 445*a* may receive the projections 447*a* of the boss 447 whereby the pole 446*a* may be detachably connected to the head 442*c* for "hooking" the head 442*c* onto the battery unit 416, for example. The pole 446*a* may be further secured to the head 442*c* by cooperation between the magnet 447*b* and a suitable magnet or plug of magnetic material 449 disposed in the recess 445 as illustrated. Accordingly, the charging apparatus 440*a* is advantageous in that, during a charging operation, the pole 446*a* is not required to remain connected to the lighting device during a battery charging operation.

Figure 16:
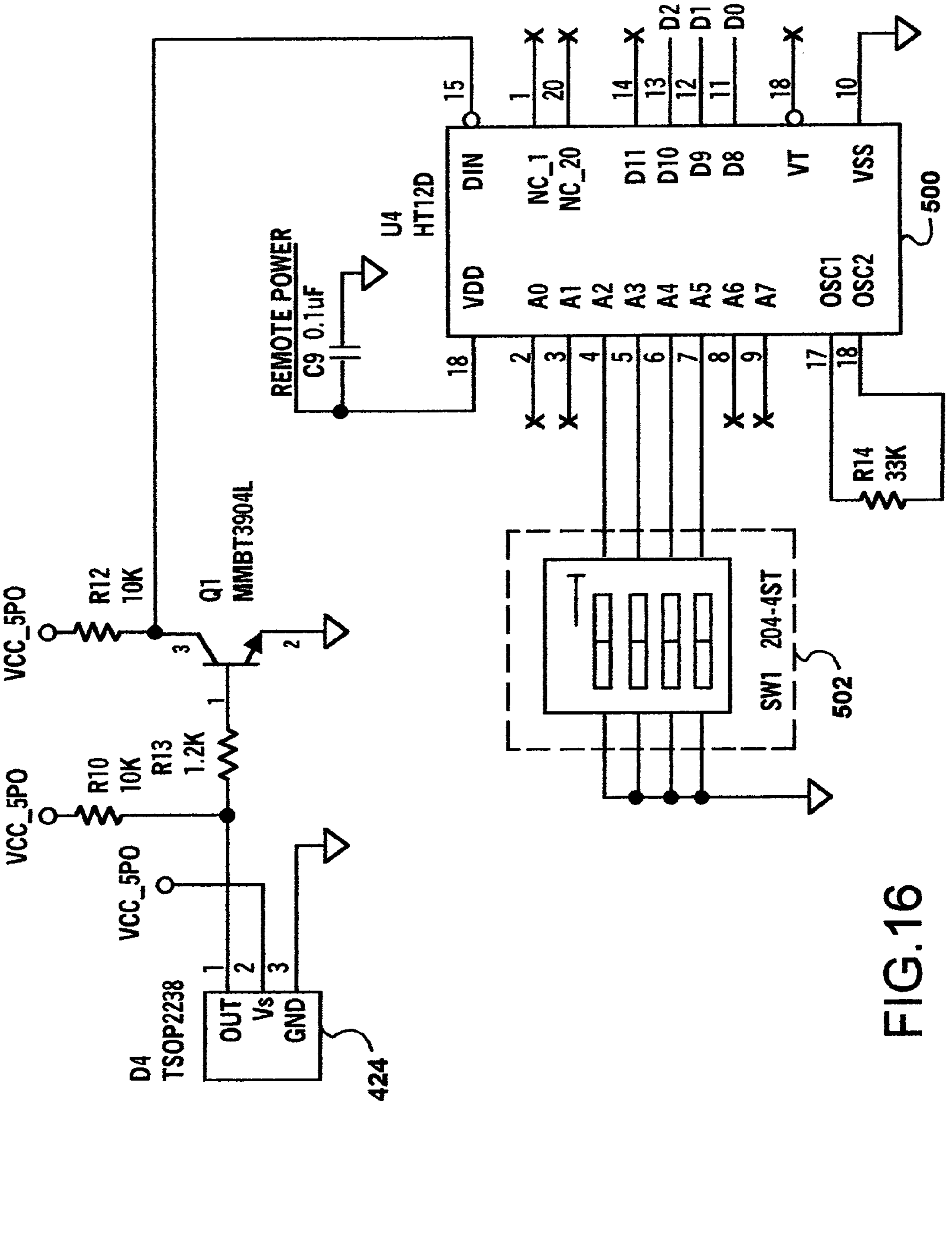
FIG. 16 is a schematic diagram of a portion of the control circuitry onboard the lighting device shown in FIGS. 9 and 10.
Figure 17:
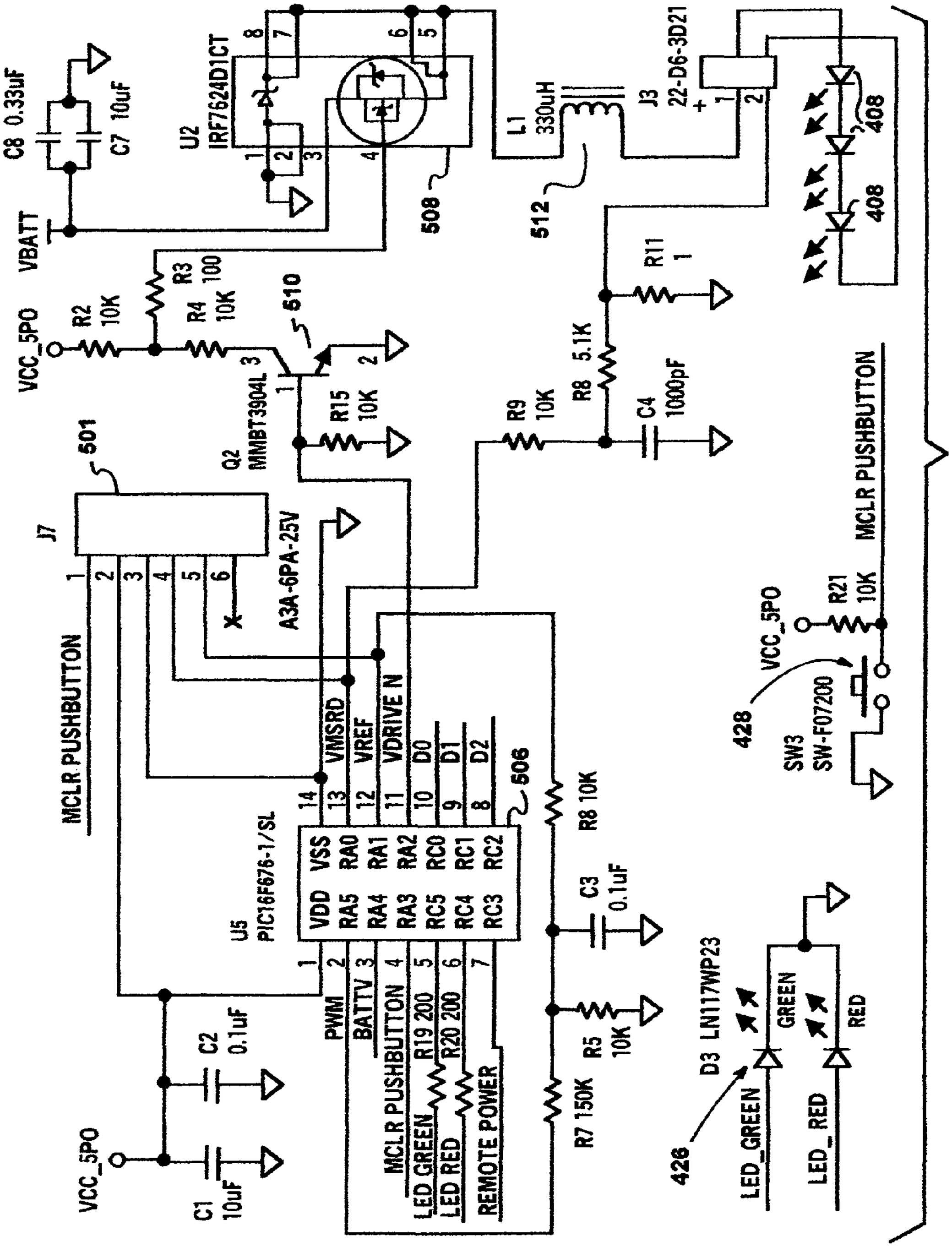
FIG. 17 is a schematic diagram of a further portion of control circuitry for the lighting device of the invention.

Referring briefly to FIGS. 16 and 17, there is illustrated control circuitry for a preferred embodiment of a controller for the lighting device 400. Certain elements, including connectors and voltage regulators are eliminated from the control circuitry shown in the interest of clarity and conciseness. As shown in FIG. 16, a portion of the control circuitry for the controller for the lighting device 400 is illustrated which is characterized by radiation sensor 424 which is operably connected to a decoder circuit 500, the output signal from which may be modified by a set of DIP switches 502 mounted on controller circuit board 412, for example. In this way the control unit 212, which may also have a set of switches or a multiposition switch mounted thereon, may be adapted to control only a particular lighting device in an array of such devices or a selected number of lighting devices in an array.

Referring to FIG. 17, the controller for the lighting device 400 further includes the momentary off/on switch 428 and the battery charge level visual indicator 426, as illustrated. The aforementioned components are operably connected to a microcontroller 506 which is connected to the light emitting diodes 408 by way of a circuit including a transistor 508 controlled by the microcontroller 506 through a control circuit 510 and a smoothing inductor 512. Thus, the microcontroller 506 may, upon receipt of instructions from a remote control unit for the lighting device 400, such as unit 212, control the energization of the LEDs 408 by imposing a signal on the LEDs whose width in time is modified via pulse width modulation (PWM) to vary the light intensity emitted by the lighting device 400. The microcontroller 506 may be suitably programmed to operate in accordance with desired operating characteristics of the lighting device 400 by temporary connection to a programming computer, not shown, via a connector 501, FIG. 17.

Figure 18:
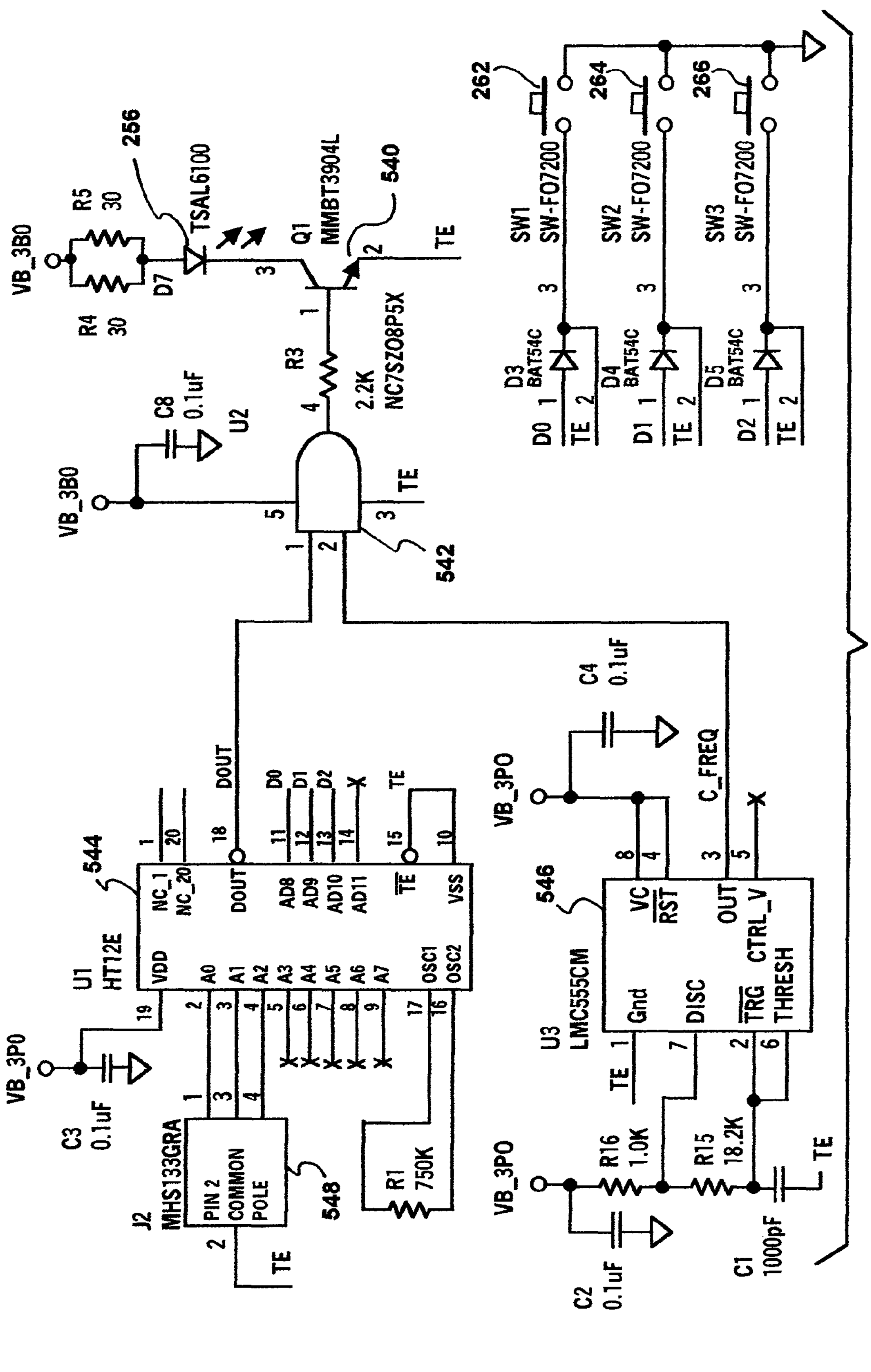
FIG. 18 is a schematic diagram of control circuitry for a remote control unit for the lighting device of the invention.

Referring briefly to FIG. 18, there is illustrated a schematic diagram for the control circuitry for the remote control unit 212. Remote control unit 212 is operable to transmit a coded signal to the controller for the lighting device of the invention by way of, for example, an infrared emitter, such as the emitter 256. Emitter 256 is driven by a transistor 540 which is connected to an AND gate 542, the inputs for which comprise the output from an encoder circuit 544 and a modulation circuit 546, both operably connected to the battery source 260, not shown in FIG. 18. The encoder circuit 544 is also connected to a three position slide switch 548 which establishes, in combination with the DIP switches 502 FIG. 17, a predetermined code specific to controlling a particular one of a lighting device of the invention, such as the device 400, without inadvertently controlling similar lighting devices in the vicinity of the lighting device 400. Remote control unit 212 is operable to be in an off, non-power consuming condition, until any one of the pushbutton switches 262, 264 or 266 is actuated to control an output signal to be provided by the encoder circuit 544. The control circuitry for the remote control unit 212 may be constructed using commercially available circuit components as indicated in the diagram of FIG. 18.

Figure 20:
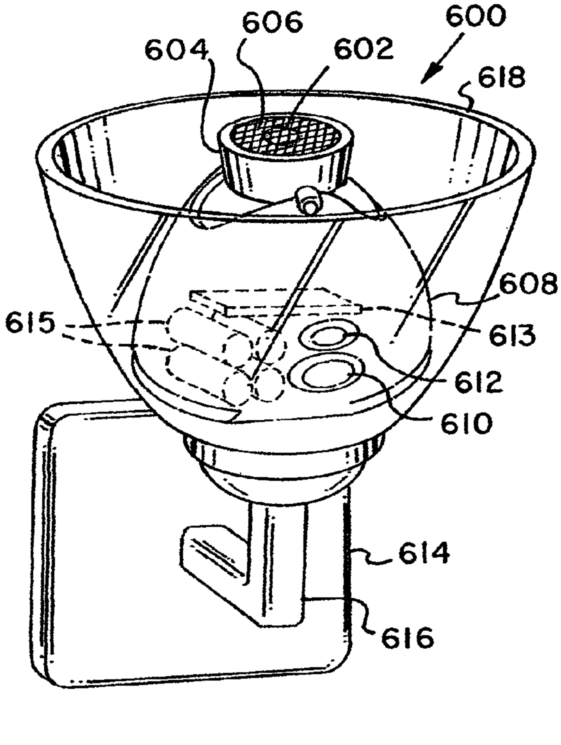
FIG. 20 is a perspective view of a wall sconce embodiment of the invention.

Those skilled in the art will appreciate from the foregoing description that the lighting device of the present invention is indeed versatile and may be utilized in many applications. For example, viewing FIG. 20, there is illustrated a further embodiment of a lighting device in accordance with the invention and generally designated by the numeral 600. The lighting device 600 may include a single LED 602 disposed in a movable housing 604 and operable to emit light through a suitable lens 606. Housing 604 is mounted for limited movement on a second housing 608 which includes control circuitry 613 and a battery power source 615, essentially like that of the embodiments of FIG. 2, FIG. 6 or FIGS. 9 and 10. Single LED lighting device 600 is further characterized by a control switch 610 for energizing or deenergizing the single LED 602 as well as a second switch 612 for controlling the light intensity. Lighting device 600 is particularly adapted for disposition and operation as a sconce, which sconce includes a suitable wall bracket 614 and a pedestal 616 connected thereto and supporting an upward facing light shielding or light disseminating shade 618. Light disseminating shade 618 is shown as a translucent member, by way of example. Lighting device 600 may be integral with the wall bracket and shade 618 or may be adapted to be placed in and supported by the shade, as illustrated. A battery recharging connector is not shown in the embodiment of FIG. 20 but may be provided on the housing 608 in the same manner as is provided for the embodiments of FIG. 2 and FIGS. 9 and 10, for example. In all events, those skilled in the art will recognize that the lighting device 600 is versatile in the sense that it may be an integral part of a wall sconce or may be easily removed from the supporting shade member 618 for replacement or battery recharging, as needed.

The construction and use of the versatile lighting device embodiments of the invention, as described hereinabove, is believed to be readily understandable to those of ordinary skill in the art. Conventional engineering materials and components may be used to construct the embodiments of the lighting devices described herein. Although preferred embodiments of a lighting device in accordance with the invention have been described above, those skilled in the art will also recognize that various substitutions and modifications may be made without departing from the scope and spirit of the appended claims.

What is claimed is:

1. A electronic charging system, the system comprising, comprising:

a charging apparatus;

a battery unit;

wherein the battery unit comprises a connection apparatus connecting the battery unit to the charging apparatus when charging the battery unit;

wherein the charging apparatus comprises a head member selectively engaged with the battery unit electrically connecting the battery unit to the battery charging apparatus during charging of the battery unit and disconnecting the battery unit from the battery charging apparatus when not charging the battery unit;

wherein the battery unit comprises a unit housing, the unit housing comprising spaced apart curved fingers which selectively receive the head member of the charging apparatus and bias electrical contacts of the head member of the charging apparatus into engagement with electrical contacts on the battery unit electrically connecting the battery unit to the battery charging apparatus during charging of the battery unit;

wherein the charging apparatus comprises a pole or rod coupled to the head member of the charging apparatus; and a power control circuit coupled to the battery unit, the power control circuit configured to provide electrical current from the battery unit to an electrical load.

2. The charging system of claim 1, wherein the power control circuit provides electrical current from the battery unit to an electrical load using pulse width modulation.

3. The charging system of claim 1, further comprising a selectable number of additional battery units selectively connected in series with the battery unit to extend power output from the power control circuit.

4. The charging system of claim 1, further comprising a selectable number of additional battery units selectively connected in parallel with the battery unit to extend the life of power output by the power control circuit.

5. The charging system of claim 4, further comprising a microprocessor controlled circuit coupled to the battery unit, wherein the microprocessor controlled circuit allows only a single battery unit at a time to be used for supplying current to the electrical load.

6. The charging system of claim 4, further comprising a microprocessor controlled circuit coupled to the battery unit, wherein the microprocessor controlled circuit allows only a single battery unit to be charged at a time.

7. The charging system of claim 1, further comprising a photovoltaic power source coupled to the battery unit to charge the battery unit.

8. The charging system of claim 1, wherein the pole or rod comprises a breakaway coupling that breaks away, while charging, when the pole or rod is inadvertently substantially deflected.

9. The charging system of claim 1, wherein the pole or rod is detachably coupled to the head member such that during charging of the battery unit, the pole or rod can be removed.

10. The charging system of claim 9, wherein the pole or rod is detachably coupled to the head member using a magnet.

11. The electrical charging system of claim 1, wherein the pole or rod is so dimensioned as to permit the battery charging contacts on the head member to engage with the battery charging contacts on the rechargeable battery unit when the battery unit is located beyond the grasp of a user.

12. A method of charging a battery unit, wherein the battery unit comprises connection apparatus connecting the battery unit to a charging apparatus when charging the battery unit, wherein the charging apparatus comprises a head member selectively engaged with the battery unit electrically connecting the battery unit to the battery charging apparatus during charging of the battery unit and disconnecting the battery unit from the battery charging apparatus when not charging the battery unit, and wherein the battery unit comprises a unit housing, which comprises spaced apart curved fingers which selectively receive the head member and bias electrical contacts of the head member into engagement with electrical contacts on the battery unit electrically connecting the battery unit to the battery charging apparatus during charging of the battery unit and wherein: the charging apparatus comprises a pole or rod coupled to the head member of the charging apparatus, the method comprising:

using the pole coupled to the head member of the charging apparatus, extending the head member to the spaced apart curved fingers which selectively receive the head member and bias electrical contacts of the head member into engagement with electrical contacts on the battery unit electrically connecting the battery unit to the battery charging apparatus during charging of the battery;

selectively engaging the head member with the spaced apart curved fingers, wherein the spaced apart curved fingers are laterally and upwardly extending arcuate fingers, such that the spaced apart curved fingers support the head member and bias the electrical contacts of the head member into engagement with the electrical contacts on the battery unit during charging of the battery unit; and applying electrical power to the head member causing the battery unit to be charged.

13. The method of claim 12, further comprising disconnecting the pole or rod from the head member during charging of the battery unit.

14. The method of claim 13, wherein disconnecting the pole or rod from the head member during charging of the battery unit comprises disconnecting a magnetic cooperation between the pole or rod and the head member, such that disconnection is accomplished when the connection between the pole or rod and the head member is beyond the grasp of the user.

15. The method of claim 12, further comprising selectively coupling a number of additional battery units in series with the battery unit to extend power output from the power control circuit.

16. The method of claim 12, further comprising selectively coupling a number of additional battery units in parallel with the battery unit to extend the life of power output by the power control circuit.

17. The method of claim 12, wherein the battery unit is selectively coupled in parallel with a number of additional battery units, the method further comprising using charging only a single battery unit a time.

18. The method of claim 17, wherein charging only a single battery unit a time comprises using a microprocessor controlled circuit coupled to the battery unit, wherein the microprocessor controlled circuit allows only a single battery unit at a time to be charged.

19. The method of claim 17, wherein charging only a single battery unit a time comprises using dip switches coupled to the battery unit, wherein the dip switches allow only a single battery unit at a time to be charged.

20. A electronic charging system, the system comprising, comprising:

a charging apparatus;

a battery unit;

wherein the battery unit comprises a connection apparatus connecting the battery unit to the charging apparatus when charging the battery unit;

wherein the charging apparatus comprises a head member selectively engaged with the battery unit electrically connecting the battery unit to the battery charging apparatus during charging of the battery unit and disconnecting the battery unit from the battery charging apparatus when not charging the battery unit;

wherein the charging apparatus comprises an elongated pole or rod magnetically coupled to the head member of the charging apparatus; and a power control circuit coupled to the battery unit, the power control circuit configured to provide electrical current from the battery unit to an electrical load.

* * * * *

UNITED STATES PATENT AND TRADEMARK OFFICE

CERTIFICATE OF CORRECTION

PATENT NO. : 7,772,801 B2
APPLICATION NO. : 12/567468
DATED : August 10, 2010
INVENTOR(S) : Dowdy et al.

It is certified that error appears in the above-identified patent and that said Letters Patent is hereby corrected as shown below:

Column 1
Line 8, change “Ser. No. 11/345,813” to --Ser. No. 11/345,817--

Column 7
Line 7, change “is,” to --is--

Column 12
Line 2, change “A electronic charging system, the system comprising,” to --An electronic charging system, the system--
Line 67, after “comprises” insert --a--

Column 14
Line 22, change “A electronic charging system, the system comprising,” to --An electronic charging system, the system--

Signed and Sealed this
Eighth Day of March, 2011

David J. Kappos
*Director of the United States Patent and Trademark Office*